(12) United States Patent
Deutscher et al.

(10) Patent No.: US 9,971,351 B2
(45) Date of Patent: May 15, 2018

(54) ORIENTATION DEVICE FOR ELECTRICALLY OPERATED TRANSPORTATION VEHICLES, AUTOMATICALLY GUIDED IN FACTORY BUILDING

(71) Applicant: GRENZEBACH MASCHINENBAU GMBH, Asbach-Baeumenheim (DE)

(72) Inventors: Reiner Deutscher, Karlsruhe (DE); Gunar Baier, Mannheim (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 0 days. days.

(21) Appl. No.: 15/103,743

(22) PCT Filed: Jan. 14, 2015

(86) PCT No.: PCT/DE2015/000011
§ 371 (c)(1),
(2) Date: Jun. 10, 2016

(87) PCT Pub. No.: WO2015/106755
PCT Pub. Date: Jul. 23, 2015

(65) Prior Publication Data
US 2016/0313740 A1  Oct. 27, 2016

(30) Foreign Application Priority Data
Jan. 14, 2014 (DE) .................. 10 2014 000 375

(51) Int. Cl.
*G05D 1/02* (2006.01)
*B60L 11/18* (2006.01)
(Continued)

(52) U.S. Cl.
CPC .......... *G05D 1/0234* (2013.01); *B60L 11/182* (2013.01); *B60R 11/04* (2013.01);
(Continued)

(58) Field of Classification Search
CPC .......... G05D 1/02; G05D 1/00; G05B 19/418; G06K 9/62; G01B 11/00; B65G 1/137; B66F 9/06
(Continued)

(56) References Cited

U.S. PATENT DOCUMENTS 4,345,662 A     8/1982  Deplante
4,647,784 A *  3/1987  Stephens ............... G01S 17/87
                                                    250/559.3
(Continued)

FOREIGN PATENT DOCUMENTS

DE            4416882        11/1995
DE         202007012798       2/2009
(Continued)

OTHER PUBLICATIONS

Aplicaciones de la Vision Artifical "ArUco: a minimal library for Augmented Reality applications based on OpenCv" http://web.archive.org/web/20110321144235/http://www.uco.es/investiga/grupos/ava/node/26 (Mar. 21, 2011).
(Continued)

*Primary Examiner* — Tan Q Nguyen
(74) *Attorney, Agent, or Firm* — Duane Morris LLP; Gregory M. Lefkowitz; Jason M. Nolan

(57) ABSTRACT

The invention relates to a device and method for the orientation of electrically driven transport vehicles, especially so-called AGVs (automatic guided vehicles), automatically guided in factory buildings, the invention having the following features: a) a camera for identifying the reference points of a planned route using markers, in particular on the basis of the data matrix code, wherein a position marker is made up of an arrangement of nine data matrix codes arranged in a square, and wherein the diagonals of 3 individual codes are located on a straight line; b) a front
(Continued)

Figure 1:
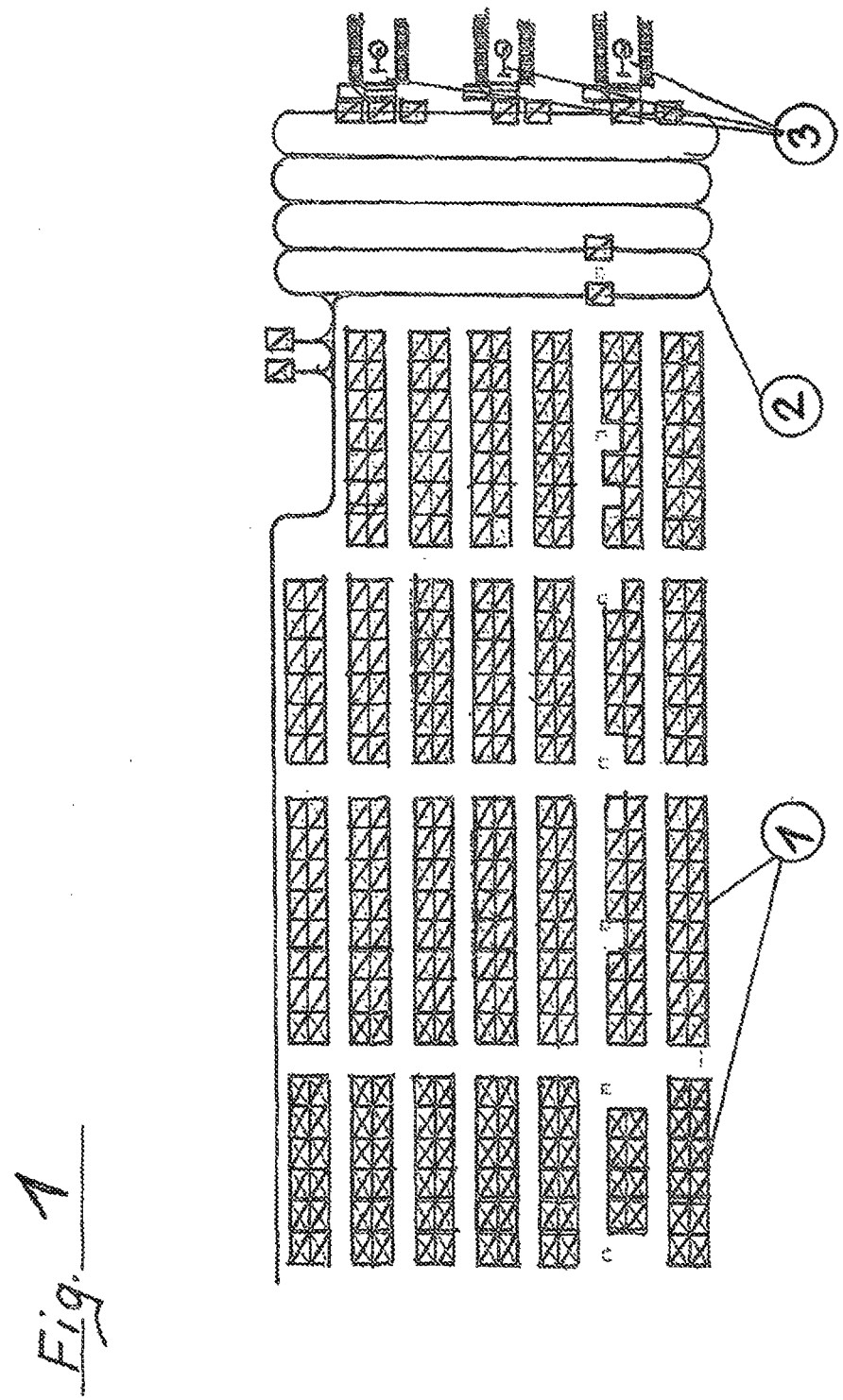

ultrasound sensor and a rear ultrasound sensor; c) a laser scanner; and d) a light-field sensor.

10 Claims, 6 Drawing Sheets

(51) Int. Cl.
  *B60R 11/04* (2006.01)
  *B66F 9/06* (2006.01)
  *G05D 1/00* (2006.01)
  *G05B 19/418* (2006.01)

(52) U.S. Cl.
  CPC ............ *B66F 9/063* (2013.01); *G05D 1/0011* (2013.01); *G05D 1/0236* (2013.01); *G05D 1/0255* (2013.01); *B60R 2300/108* (2013.01); *B60R 2300/8086* (2013.01); *G05D 2201/0216* (2013.01)

(58) Field of Classification Search
  USPC ........................................ 701/23, 25, 26, 28
  See application file for complete search history.

(56) References Cited

U.S. PATENT DOCUMENTS

| | | | | |
|---|---|---|---|---|
| 4,684,247 | A * | 8/1987 | Hammill, III | B66F 9/0755 356/152.2 |
| 8,565,913 | B2 * | 10/2013 | Emanuel | B66F 9/0755 340/572.1 |
| 8,602,893 | B2 * | 12/2013 | Mao | G06F 3/0334 382/103 |
| 2003/0035048 | A1 * | 2/2003 | Shipp | H04N 7/183 348/68 |
| 2005/0269412 | A1 * | 12/2005 | Chiu | G06K 9/4633 235/462.03 |
| 2006/0184013 | A1 | 8/2006 | Emanuel et al. | |
| 2012/0191272 | A1 * | 7/2012 | Andersen | G06Q 10/087 701/2 |
| 2014/0214258 | A1 * | 7/2014 | Wong | B66F 9/063 701/25 |

FOREIGN PATENT DOCUMENTS

| | | |
|---|---|---|
| DE | 102010059035 | 9/2011 |
| DE | 202013008718 | 12/2013 |

OTHER PUBLICATIONS

Gawrilow, E., et al., "Dynamic Routing of Automated Guided Vehicles in Real-Time;" Technische Universität Berlin, Institut Für Mathematik, No. 039/2007.

* cited by examiner

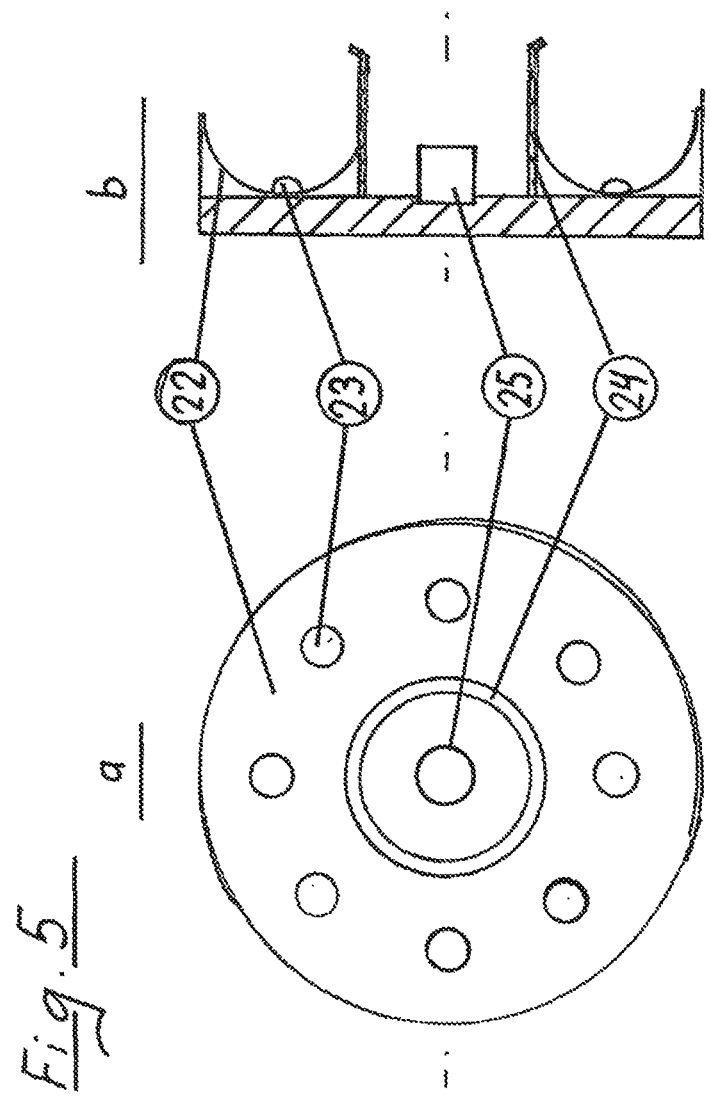

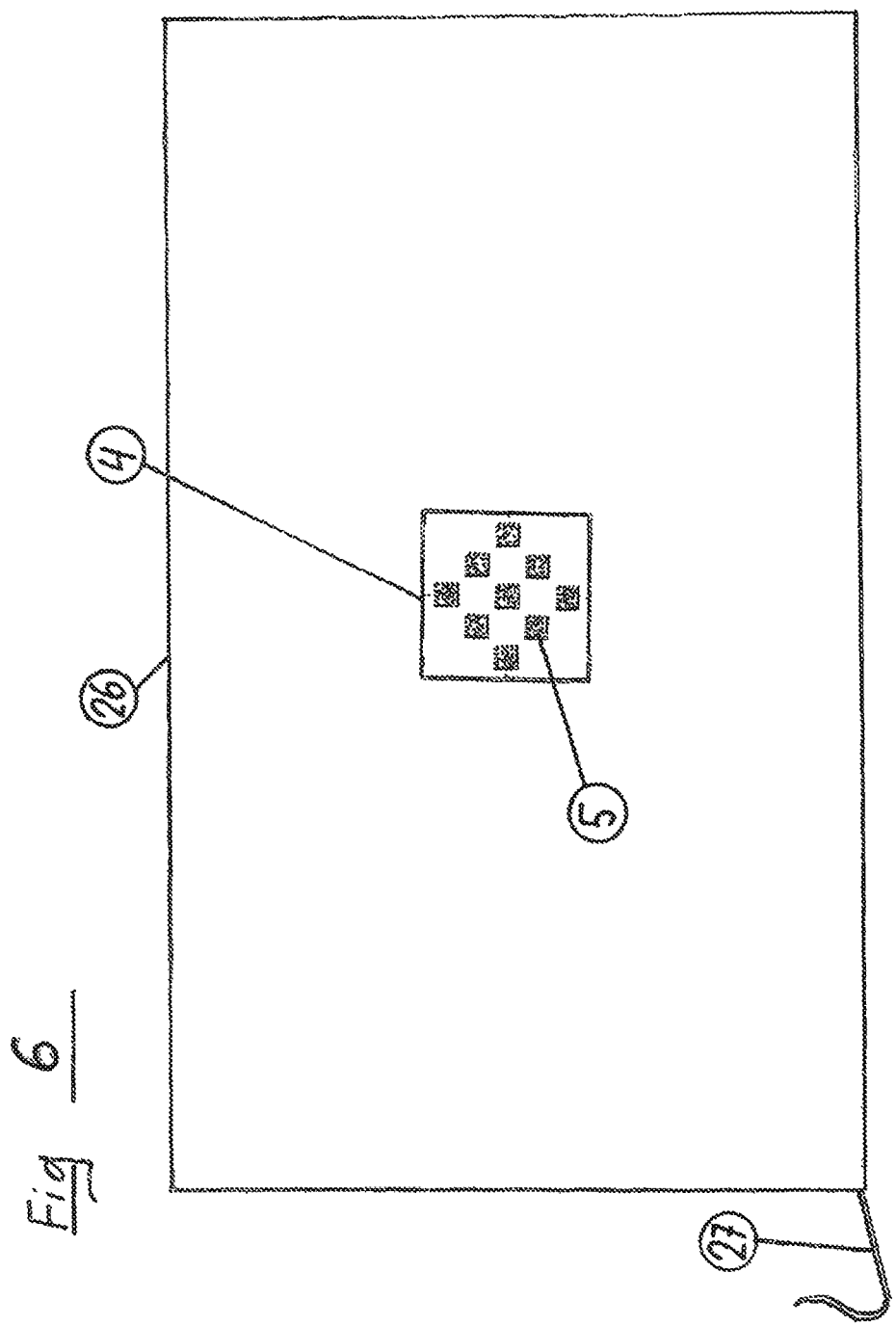

ORIENTATION DEVICE FOR ELECTRICALLY OPERATED TRANSPORTATION VEHICLES, AUTOMATICALLY GUIDED IN FACTORY BUILDING

CROSS-REFERENCE TO RELATED APPLICATIONS

This application is a § 371 national stage entry of international Application No. PCT/DE2015/000011, filed Jan. 14, 2015, which claims priority to German Patent Application No. 10 2014 000 375.2 filed Jan. 14, 2014, the entire contents of which are incorporated herein by reference.

The present invention relates to an orientation device for electrically operated transportation vehicles, automatically guided in factory buildings, and to a method for the fault-free operation of such vehicles.

In many corporate sectors, for example trade in food stuffs and household articles or industrial and household products, goods are placed an source pallets of an identical type with similar packages in heavy-load racks. A package in this context can be packed or unpacked piece type goods or a collection of materials such as, for example, a box, a carton or a crate with bulk goods or a plurality of individual items such as drinks bottles or milk products. In order to assemble a delivery for a specific customer, packets with different fittings or packaging have to be assembled from the above.

The provision of individual components for such a delivery in this case can be carried out manually or by means of automatic guided vehicles. Such so-called AGVs (automatic guided vehicles) can be mobile robots or vehicles which are specially designed for the respective purpose of use and are moved from one location to another with a specific guidance and control method.

Conventional automatic guided vehicles with which, for example, materials are moved in factories and warehouses, have minimal point-to-point movement control. Most of these systems use AGVs which follow a fixed guiding track. This generally involves a high-frequency transmission antenna wire which is arranged countersunk in the factory floor, a reflective strip which has been painted onto the floor or a reflective ribbon which has been bonded onto the floor. However, such guiding tracks are clearly very fragile and unreliable.

All these movement controllers limit the freedom of movement of the individual AGVs since they are forced to follow a fixed physical path.

The majority of such systems rely on the vehicle's own proximity detection in order to avoid collisions with other vehicles, non-moving objects or personnel. In such systems, the AGVs can move only in one direction along the track followed by them.

Such systems achieve point-to-point movement by implementing control schemes and using freely moveable AGVs with programmable, bidirectional paths. As a result, a plurality of AGVs are located simultaneously on the same paths without collisions or excessive congestion.

These methods maximize the degree of freedom of the movement of the AGV. The control scheme implements here a scheme of "static" collision avoidance for AGV systems. Essentially, a computer program is used here for examining the respective surroundings of an AGV in order to determine only path along which AGVs can travel. A further assignment program extracts the necessary data therefrom in order to move AGVs in the respective system from one point to another without two AGVs travelling along the same path at the same time.

The disadvantages of these methods from the prior art are that the AGVs are either restricted to closed paths, a unidirectional movement, to the absence of the external control of the AGV movement or to the "static" collision avoidance, in order to change their position appropriately.

In this respect, the prior art discloses, in DE 20 2007 012 798 U1, a positioning system with a vehicle which is based on the aim of providing a positioning system which can operate using an epi-illumination method, to permits position resolution which is greatly improved compared to the prior art, at the same time permits very much longer travel paths and does not rule out determination of a position even when a vehicle is stationary.

For this purpose, inter alia a positioning system is claimed here which has essentially the following components:

A) a vehicle which can move at least unidimensionally in the X direction along a travel path or on a trajectory by means of a drive, B) at least one display which is arranged in the surroundings of the vehicle, does not participate in the movement thereof and on which at least one marker can be displayed, C) a camera, in particular CCD camera, whose position with respect to the vehicle in the X direction is known and which is preferably rigidly arranged on the vehicle, participates in the movement thereof and can be positioned by means of the method of the vehicle in such a way that the marker which is displayed on the display is located in the capturing range of the camera and is therefore imaged by the camera as a marker image which is located within the field of view of the camera.

D) an EDV device which is connected to the camera and which is capable of determining the X component of the relative position of the vehicle with respect to the marker displayed on the display, by means of an image processing program from the position of the marker image in the field of view of the camera, and to use the result to position the vehicle, using the drive, at an X set point position which is predefined with respect to the display or marker or within a predefined tolerance range around the X setpoint position in the X direction.

In claim 5 it is claimed that the code carrier which is displayed on the display is a unidimensional bar code or a two-dimensional bar code or a data matrix code.

In order to supply a comparable vehicle with electrical energy, a device for the contactless transmission of energy to a vehicle is known from DE 10 2010 050 935 B4.

In order to achieve the most powerful possible transmission of energy, in this document a device for the contactless transmission of energy from a coil arrangement to a secondary winding provided in a vehicle is claimed, said device being characterized by the following features, specifically that the coil arrangement has a plastic part which has on a planar surface region a countersunk region in which the coil winding is arranged, wherein a planar ferrite region is arranged on the planar surface part, and wherein the plastic part has an edge region which is raised in such a way that a trough-shaped region is formed which also surrounds the countersunk region.

In addition it is claimed here that the trough-shaped region is potted with potting compound in such a way that the coil winding in the countersunk region together with the ferrite region is potted with potting compound, wherein the coil arrangement is arranged on a floor in such a way that the vehicle, in particular wheels of the vehicle, can travel over the coil arrangement, wherein the potting compound is arranged on the side of the plastic part facing away from the vehicle.

The object of the present invention is to provide an orientation system for transportation vehicles which are automatically guided in factory buildings and with which the rapid transportation of heavy-load racks can become free of faults.

This object is achieved by means of the device as claimed in claim 1:

An orientation device for electrically operated transportation vehicles, automatically guided in factory buildings, in particular what are referred to as AGVs (automatic guided vehicles), having the following features:
a) a camera (6, 25) for identifying the reference points of a planned route by means of markers, in particular according to the data matrix code, wherein a position marker is constructed from an arrangement composed of nine data matrix codes which are arranged in a square, and wherein the diagonals of three individual codes are located on a straight line,
b) a front ultrasound sensor (20) and a rear ultrasound sensor (13),
c) a laser scanner (9), and
d) a light field sensor (21).

In addition, there is provision, as a particular refinement, that the data matrix camera (25) for illuminating the detection field is surrounded by a multiplicity of LEDs (23), arranged in a circular shape, wherein the camera (25) is screened from scattered light by means of a cylinder (24), and wherein each LED is additionally surrounded by an annular reflector (22).

Furthermore, there can be provision
that it comprises a charging mat (26) with a marker which serves to detect a position.

and the method according to claim 4
An orientation method for electrically operated transportation vehicles, automatically guided in factory buildings, in particular what are referred to as AGVs (automatic guided vehicles), having the following features:
a) a control center in a factory building gives a specific transportation vehicle (AGV) the order to transport a picked-up heavy-load rack (10) to a specific destination according to a predefined planned route,
b) the corresponding transportation vehicle follows the predefined planned route from reference point reference point, wherein the corresponding markers of the planned route are detected by a camera (6, 25) and driven to, wherein the orientation over a large area is carried out in conjunction with a light field sensor (21) by means of a laser scanner (9),
c) the picked-up load is set down by the transportation vehicle (AGV) at the destination.

Furthermore, it is claimed
that relatively small potential obstacles are detected by a front ultrasound sensor (20) during forward travel, and by a rear ultrasound sensor (13) during rearward travel.

Furthermore, it is claimed
that the markers are configured according to a data matrix code, wherein a position marker is constructed from an arrangement composed of nine data matrix codes which are arranged in a square, and wherein the diagonals of three individual codes are located on a straight line. And that when the transportation vehicle (AGV) is deficient in energy, a charging mat (29) is driven to in order to recharge the electrical accumulators.

In addition, the following are claimed:
a computer program having a program code for carrying out the method steps when the program is run in a computer.
Machine readable carrier having the program code of a computer program for carrying out the method when the program is run in a computer.

The device according to the invention is described in more detail below.

In particular:
FIG. 1: shows a factory building with transportation carriages,
FIG. 2: shows an illustration of the data matrix code which is used,
FIG. 3: shows possibilities of correcting a selected route,
FIG. 4: shows a side view of an AGV with a lifting plate,
FIG. 5 shows a view of a detail of the data matrix camera,
FIG. 6 shows an illustration of a data matrix code on a charging mat.

FIG. 1 shows a factory building with transportation carriages. Here, a detail from a comparatively large factory building with transportation carriage 1 is illustrated. Order picking stations 3 serve to collect the goods which are required for a delivery. If waiting times arise at the order picking stations during the work, the corresponding transportation carriages 1 wait in the region of waiting loops 2 which are equipped with induction lines which are laid in the floor, in order to use such waiting times to charge electrical accumulators with the respective used AGV systems.

Figure 2:
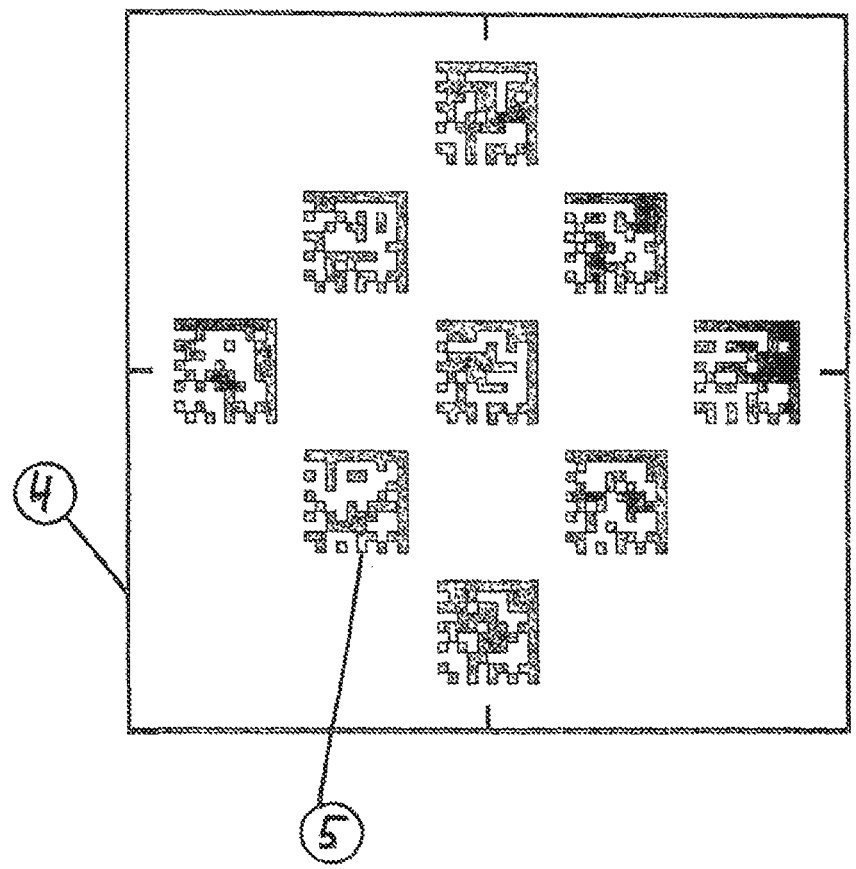

FIG. 2 shows an illustration of the data matrix code which is used. 4 denotes here the data matrix code carrier, and 5 denotes the selected code itself. In addition to the marking of goods or locations, a data matrix code is known as a marker. A data matrix code is attached here to the floor or to some other underlying surface and is detected, when a vehicle travels over it, by a camera which is mounted on the vehicle and directed downward. In the respective marker information is encoded which relates, for example, to the position of the location and/or contains other specific information.

A data matrix code is composed of light or dark cells which are arranged as a data matrix. The individual cells are configured in a square and should not exceed a tolerance of plus or minus 10%.

Basically, in the case of a data matrix code the position of the individual cells (location) and the filling of a cell are evaluated, wherein a black cell corresponds to binary one, and a white cell to binary zero.

The data matrix code is delimited by two search elements which serve to detect a location during the reading of the code. Search elements are a horizontal boundary line and a vertical boundary line which are located with respect to one another in the shape of a L. The search elements serve also to detect distortions and to determine the size. The two interrupted lines (alternating grid or clock cycle lines) opposite the search elements serve as a basis for the creation of the data matrix. The search elements and the clock cycle cells surround the region of the useful data. This region also contains the redundant data for the data protection which is calculated according to the Reed Solomon error correction algorithm.

By using the known data matrix technology, according to FIG. 2, a novel arrangement of a marker is provided in which a position marker is constructed from an arrangement composed of nine data matrix codes. These data matrix codes are arranged in a square, wherein in each case the diagonals of the three individual codes are located on a straight line.

In this context, the same information on the position of the location and on the characterization of the location is encoded firstly for all the individual codes.

In addition, a further symbol is encoded with the result that each individual code has uniquely assignable detection.

By means of the sensor devices which are located on a vehicle which can travel over the marker which is shown, one or more individual codes are detected during the travel. As a result of known image detection methods (such as, for example, data matching), both the stored information and the relative orientation of the camera and code are detected here.

If the novel arrangement of a marker which is shown is located at an intersection point of various travel routes, this code can be equally well read from all directions. In the event of a rotation of a vehicle travelling over the code at the center point of the code, the sensor data (rotational angle) can be used to position the vehicle.

Deviations from a planned route can be detected by virtue of the fact that the information content of the respectively detected codes is evaluated.

In this way, a lateral deviation from the center line and/or a deviation in the travel angle from a selected route can be detected. This information permits immediate correction of the selected route.

Figure 3:
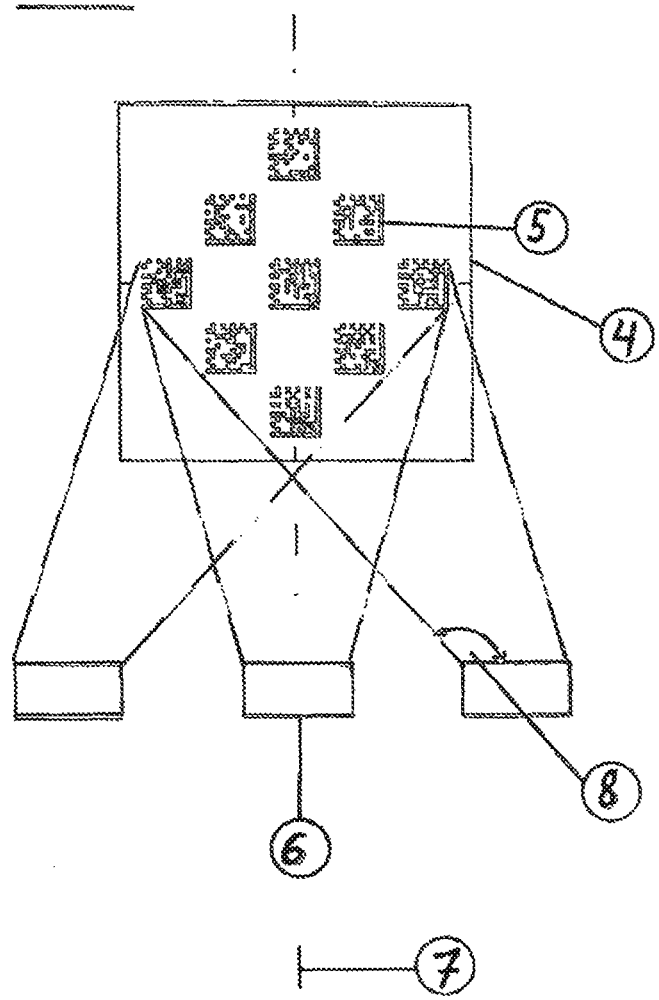

FIG. 3 shows possibilities of corrections of a selected route. The data matrix code carrier 4 with the specific data matrix code 5 is shown here again. The ideal line 7 of a travel line such as would be shown to the camera 6 of an AGV, is illustrated in the center. To the left and right of the ideal line 7, in each case a travel line is shown which has a specific offset angle with respect to the ideal line 7.

Figure 4:
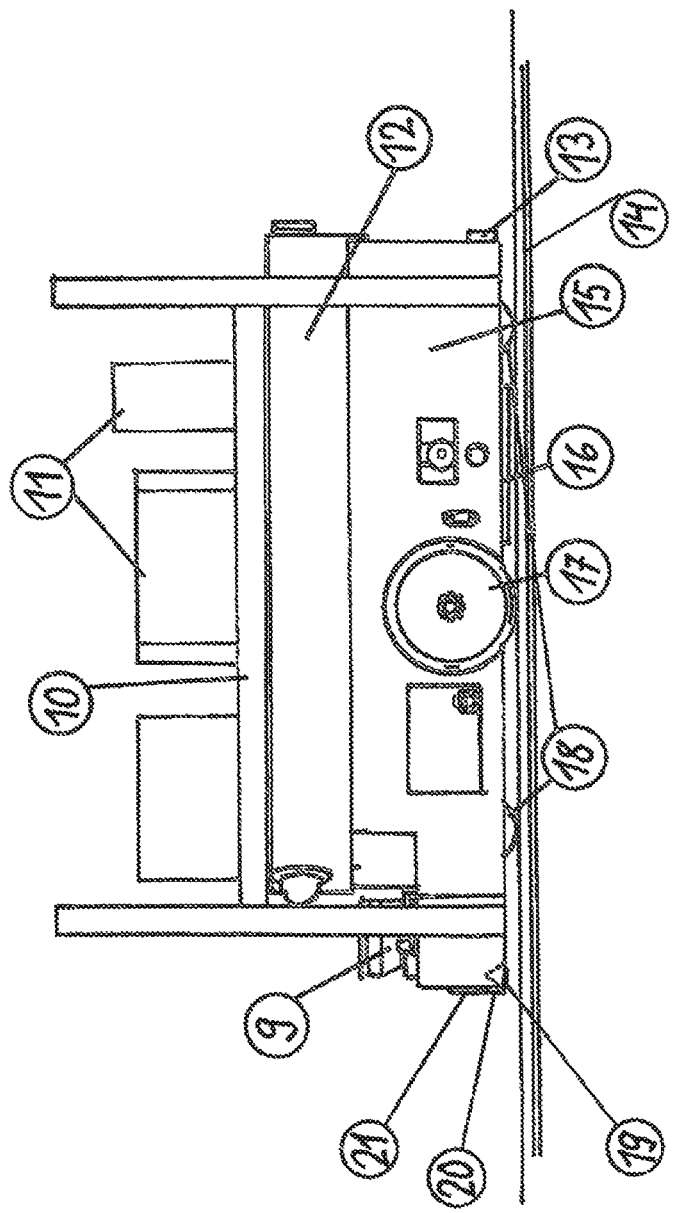

FIG. 4 shows a side view of an AGV with a lifting plate.

The AGV housing 15 has a lifting plate 12 with a transportation rack 10 resting on it with order-picked goods 11. In the center of the AGV it is possible to see one of the two drive wheels 17, accompanied by two supporting rollers 18. In this region, an induction line 14 is illustrated in the floor, and an induction current collector 16 is illustrated on the vehicle.

The identification of the information of a data matrix code is performed by a data matrix camera 19. A front ultrasound sensor 20 and a rear ultrasound sensor 13 detect obstructive structures in the region close to the floor, even during reversing.

In a particular embodiment, small stones which are lying on the floor but nevertheless disrupt the driving operation, or other obstacles, can be moved out of the way in these regions by means of air nozzles using pulse-like blasts of air. Such small obstacles can lead to difficulties, in particular in the case of AGVs with heavy loads.

A laser scanner 9 on the front side of the AGV detects orientation structures over a large area and with relevant detail.

In addition, a light field sensor 21 is mounted on the front side of the transportation vehicle. The information which is acquired by means of this optical sensor can advantageously be used to calculate, after the actual recording, an image with a focus level which is located at any desired position, and to display or evaluate said image. The same optical sensor can therefore be used both for focused display of objects located very close as well as for focused display of objects located very far away, wherein, furthermore, both displays can be calculated from the same acquired information. The provision of a costly lens system, zoom system or auto-focusing system as an optical sensor is avoided here. Furthermore, the same acquired data can be used for the simultaneous calculation of different image displays, in each case with different portions of the image and different focus levels and regions with different focus depths.

With respect to the light field sensor 21 which is used, reference is made to the new development of the so-called mini-lenses which collect optical information in the form of hundreds of mini-lenses according to the light field principle, which information can then be combined later by means of data technology to form images with a desired resolution and/or a desired viewing angle. Such mini-lenses are 3-D enabled, are inexpensive to manufacture and follow the principle of an insect's eye.

In combination with the laser scanner 9, it is easily possible for the transportation vehicle to navigate between the collection of transportation racks and to cope adequately with obstacles which appear unexpectedly.

The orientation system which is presented here can be used for all types of AGVs. In particular, reference is also made here to an AGV for the transportation of heavy loads by means of a lifting arrangement composed of three lifting pins.

The electronic devices which are necessary for operating the orientation system are known to a person skilled in the art and are not described in more detail.

FIG. 5 shows a view of a detail of the data matrix camera. Here, in the image part a) it can be seen that the actual camera 25 is surrounded by a multiplicity of LEDs 23 arranged in a circular shape in order to illuminate the detection field, wherein the camera 25 is screened against scattered light by means of a cylinder 24. In the image part b) it is apparent that each LED is additionally surrounded by an annular reflector 22.

FIG. 6 shows an illustration of a data matrix code on a charging mat.

A charging mat is an especially formed, planar structure which has, in its interior, a continuous conductor track which covers the entire surface and which permits a vehicle to take up electrical energy inductively by means of suitable current collector. A control and energy supply line 27 for a charging mat 26 is used for this purpose. In order to detect the charging mat 26, a data matrix carrier 4 is arranged in the central region of the charging mat 26, said data matrix carrier 4 having a data matrix code 5 relating to this.

In order to control the described transportation vehicles, a known method is preferably used which has been developed by the Technical University of Berlin and was published on Oct. 10, 2007, with the title:

Dynamic Routing of Automated Guided Vehicles in Real-Time (Ewgenij Gawrilow, Ekkehard Köhler, Rolf H. Möhring, Björn Stenzel)

(http://www.math.tuberlin.de/coga/publications/techreports/]

This essentially involves a two-part algorithm whose first part comprises a preparatory step and whose second part calculates a route in real time and provides a specific time window for each section here. The application of the method described here relates to an AGV network in the container terminal of Altenwerder in the port of Hamburg. The application of the same method for fault-free operation of automated guided vehicles in a warehouse appears, in contrast, to be novel.

The control of the complex movement processes and the signal processing of the sensors used require a specific control program.

LIST OF REFERENCE NUMERALS

1 Transportation carriages
2 Induction lines in a waiting loop
3 Order picking stations
4 Data matrix code carrier
5 Data matrix code
6 Camera of an AGV
7 Ideal line of a travel line
8 Offset angle of a travel line
9 Laser scanner
10 Transportation rack
11 Order picked goods
12 Lifting plate
13 Rear ultrasound sensor
14 Induction line
15 AGV housing
16 Induction current collector
17 Drive wheel
18 Supporting roller
19 Data matrix camera
20 Front ultrasound sensor
21 Light field sensor
22 Reflector
23 LED
24 Cylinder
25 Camera
26 Charging mat
27 Control and energy supply line

The invention claimed is:

1. An orientation device for electrically operated transportation vehicles, automatically guided in factory buildings, comprising:
 a) a data matrix camera for identifying the reference points of a planned route by means of position markers, wherein each position marker is constructed from an arrangement composed of nine data matrix codes which are arranged in a square, and wherein diagonals of three individual data matrix codes are located on a straight line,
 b) a front ultrasound sensor and a rear ultrasound sensor,
 c) a laser scanner, and
 d) a light field sensor.

2. The orientation device as claimed in claim 1, wherein the data matrix camera for illuminating the detection field is surrounded by a multiplicity of LEDs.

3. The orientation device as claimed in claim 2, wherein the multiplicity of LEDs are arranged in a circular shape, wherein the camera is screened from scattered light by means of a cylinder, and wherein each LED is additionally surrounded by an annular reflector.

4. The orientation device as claimed in claim 1 further comprising a charging mat with a marker which serves to detect a position.

5. An orientation method for electrically operated transportation vehicles, automatically guided in factory buildings, comprising:
 a) ordering a specific transportation vehicle (AGV) having a heavy-load rack to transport the heavy-load rack to a specific destination according to a predefined planned route,
 b) instructing the specific transportation vehicle to follow a predefined planned route from reference point to reference point,
  wherein the reference points have corresponding markers of the predefined planned route that are detected by a camera on the specific transportation vehicle (AGV), and
  wherein the orientation over a large area is carried out in conjunction with a light field sensor by means of a laser scanner,
 c) off-loading the heavy-load rack on the transportation vehicle (AGV) at the specific destination.

6. The orientation method as claimed in claim 5, wherein the specific transportation vehicle (AGV) comprises front and back ultrasound sensors, and relatively small potential obstacles are detected by the front ultrasound sensor during forward travel, and by the rear ultrasound sensor during rearward travel.

7. The orientation method as claimed in claim 5, wherein the markers are configured according to a data matrix code, wherein a position marker is constructed from an arrangement composed of nine data matrix codes which are arranged in a square, and wherein the diagonals of three individual codes are located on a straight line.

8. The orientation method as claimed in claim 5, wherein the transportation vehicle (AGV) is deficient in energy, a charging mat is driven to in order to recharge the electrical accumulators.

9. A computer program having a program code for carrying out the method steps as claimed in claim 5, wherein the program is run in a computer.

10. A machine-readable carrier having the program code of a computer program for carrying out the method as claimed in claim 5, wherein the program is run in a computer.

* * * * *